June 23, 1953   C. W. GENTRY   2,642,822
METHOD OF MAKING SANDWICHES
Original Filed Feb. 11, 1947   3 Sheets-Sheet 1

Carlyle W. Gentry
INVENTOR.

June 23, 1953 — C. W. GENTRY — 2,642,822

METHOD OF MAKING SANDWICHES

Original Filed Feb. 11, 1947 — 3 Sheets-Sheet 2

Carlyle W. Gentry
INVENTOR.

BY
Attorneys

June 23, 1953 — C. W. GENTRY — 2,642,822
METHOD OF MAKING SANDWICHES
Original Filed Feb. 11, 1947 — 3 Sheets-Sheet 3
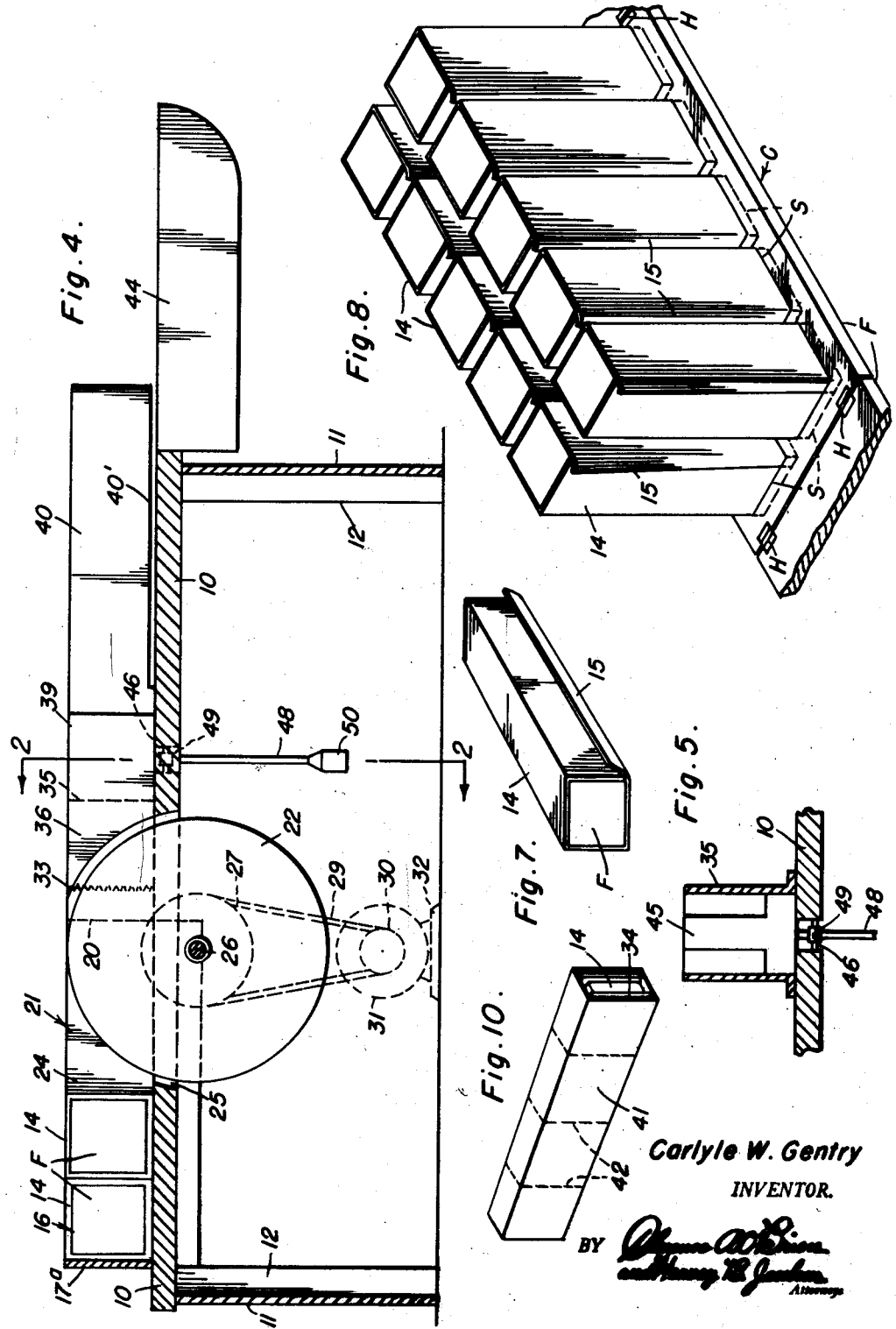
Carlyle W. Gentry
INVENTOR.

Patented June 23, 1953

2,642,822

UNITED STATES PATENT OFFICE 2,642,822

METHOD OF MAKING SANDWICHES

Carlyle W. Gentry, Bluefield, W. Va.

Original application February 11, 1947, Serial No. 727,838, now Patent No. 2,521,213, dated September 5, 1950. Divided and this application December 26, 1947, Serial No. 793,859

2 Claims. (Cl. 107—54)

This invention relates to improvements in wrapped sandwiches and more particularly to a method of producing the same.

This application is a division of my copending application filed February 11, 1947, Serial No. 727,838, entitled Machine for Making Ice Cream Sandwiches, now Patent No. 2,521,213, dated September 5, 1950.

The primary object of the invention is to produce an ice cream sandwich and preserve it from contamination during the handling and dispensing thereof.

Another object is to deliver one or more sandwiches to the consumer in a fully wrapped condition so that the edible part of the sandwich will not be touched by human hands from the time of the production thereof until the delivery of the sandwich or sandwiches to the consumer.

The above and other objects may be attained by employing this invention which embodies solidifying in a tube of frangible material a mass of sandwich filling, slicing the tube and solidified mass of filling into partially wrapped sandwich fillers, successively introducing the partially wrapped fillers between wafers of edible material to form partially wrapped sandwiches and successively introducing the partially wrapped sandwiches so formed in edge-to-edge relation into a tube of frangible material.

Other objects and advantages reside in the details of construction and operation as more fully hereinafter described and claimed, reference being had to the accompanying drawings forming part hereof, wherein like numerals refer to like parts throughout, and in which:

Figure 4 is a longitudinal sectional view taken on the line 4—4 of Figure 1;

Figure 5 is a detail vertical sectional view taken on the line 5—5 of Figure 2;

Figure 7 is a perspective view of a mass of hardened ice cream encased in the tube of flexible frangible material preparatory to the slicing thereof into sandwich fillers;

Figure 8 is a perspective view showing the manner of supporting the containers on an endless carrier or conveyor moving beneath the discharge spouts of automatic ice cream freezing machines for filling the containers for subsequent hardening in a hardening room and slicing in making the sandwiches;

Figure 10 is a perspective view of a group of sandwiches packaged and ready to be dispensed;

Figure 1:
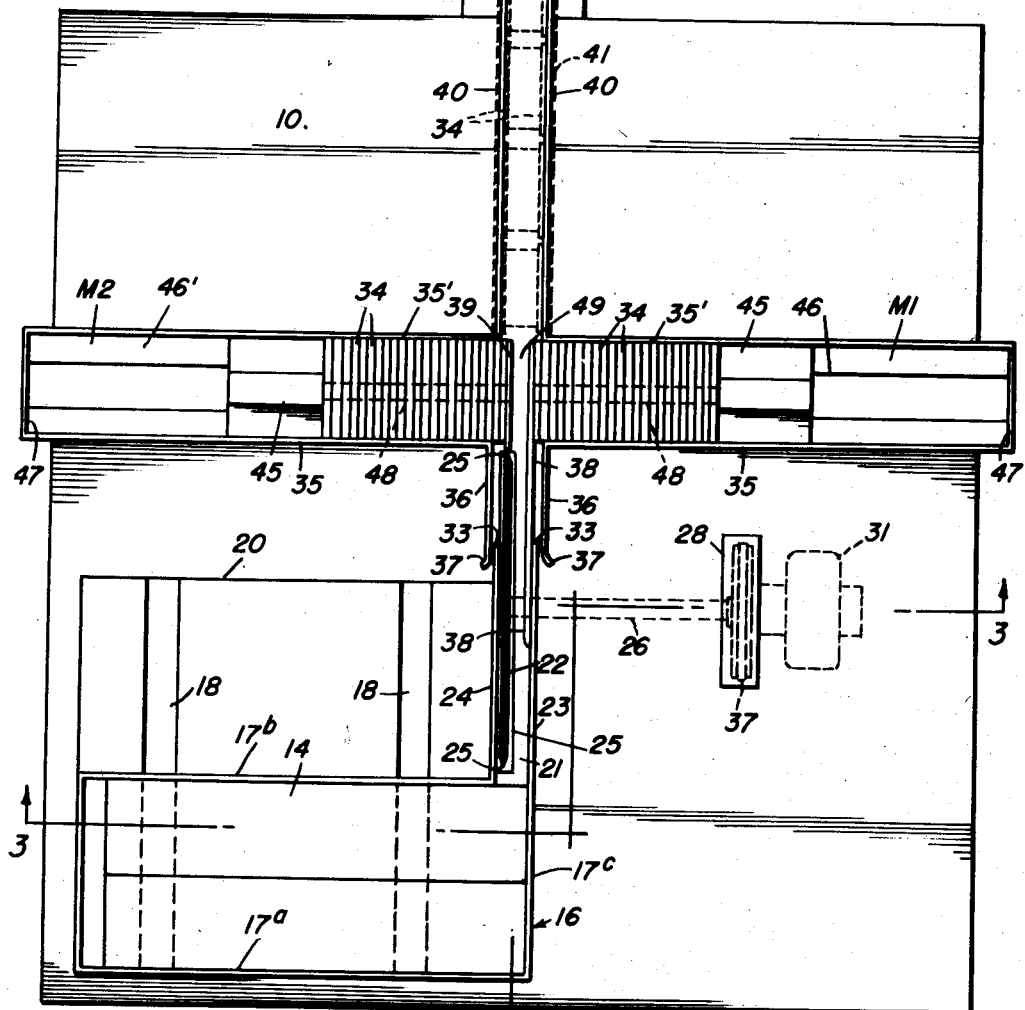
Figure 1 is a top plan view of a machine or apparatus for making ice cream sandwiches in accordance with the invention.
Figure 12:
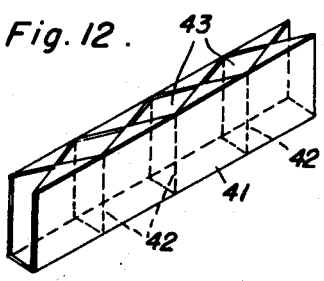
Figure 12 is a perspective view of an outer tubular wrapper of modified form.
Figure 11:
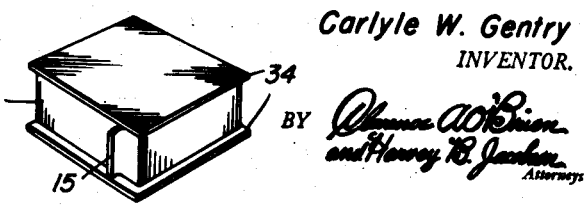
Figure 11 is a perspective view of an ice cream sandwich with the outer wafer encasing wrapper removed and showing the inner wrapper encasing the filler.

Referring to the drawings in detail, in which like reference characters designate corresponding parts throughout the several views, it may be pointed out that the ice cream or other filler is discharged from the freezing machine into tubes of flexible frangible material which are open at the ends and supported on end in spaced vertical relation, with the lower ends closed by suitable horizontal supporting surfaces which may take the form of an endless belt or conveyor or the like. The ice cream in a semi-fluid or semi-frozen condition is run into the upper open ends of the tubes which, after being filled, are run into a cold storage or hardening room for hardening. Each tube has a loose or free edge strip to facilitate the removal of the wrapping of the sandwich fillers to be more fully hereinafter described. After the hardening of the mass of ice cream therein, each tube slices into sandwich fillers, after which the sandwich fillers so formed are advanced edgewise between spaced stacks of horizontally arranged cakes or wafers to form sandwiches. The sandwiches so formed are then advanced in succession into a tubular wrapper of flexible frangible material provided at spaced regular intervals with rows of perforations or the like so that a single sandwich may be separated from the others in the wrapper for delivery to a customer without contact with the human hand of the dispenser. In this manner, the customer is assured of receiving his sandwiches in a clean, sanitary and uncontaminated condition.

As illustrated, the machine comprises a horizontal support or table 10 constituting a working surface, positioned at the top of a case or cabinet 11 which may be of metal or other material, or simply a table provided with corner supports or legs 12. A corner support may constitute the frame of the case or cabinet 11 extending to the base or floor 13 which may be the bottom of the case or cabinet.

Opening through the table 10 substantially midway between opposite side edges is an elongated slot 25 and mounted in suitable journals beneath the table and extending transversely of the slot 25 is a drive shaft 26 carrying adjacent one end a drive pulley 27 having driving connection with the drive pulley 30 of a prime mover 31, such as an electric motor, through the medium of an endless belt 29. Mounted on the shaft 26 for rotation therewith and projecting upwardly through the slot 25 is a rotary cutter 22.

Formed in the top side of the table 10 in spaced parallel relation to the slot 25 are spaced parallel guide grooves 18 the axes of which lie perpendicular to the axis of the shaft 26. These grooves 18 extend from a common plane near the front end of the table 10 to a common plane slightly to the rear of the shaft 26 and cooperate with guide tongues on the frame to be more fully hereinafter described.

Figure 2:
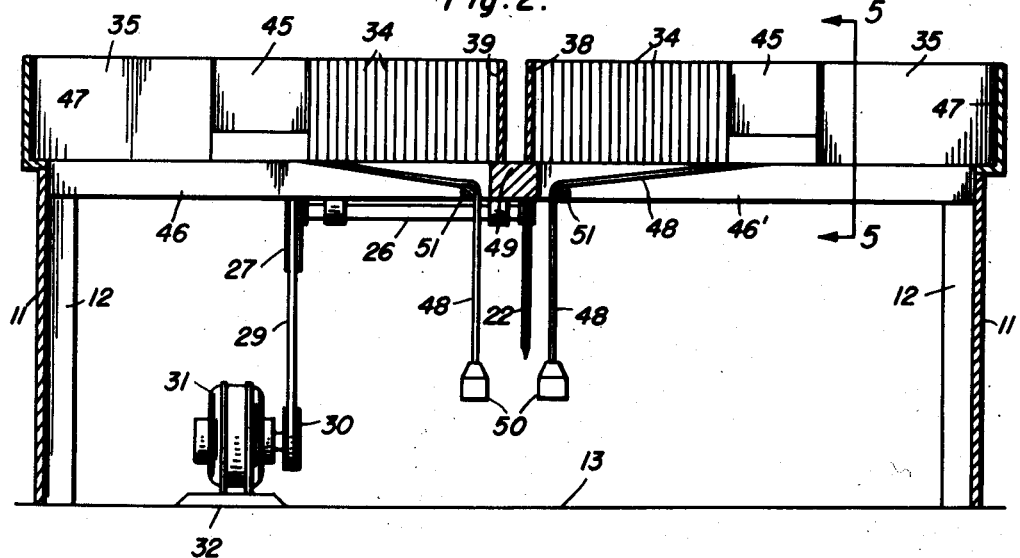
Figure 2 is a vertical cross sectional view taken on the line 2—2 of Figure 4.
Figure 3:
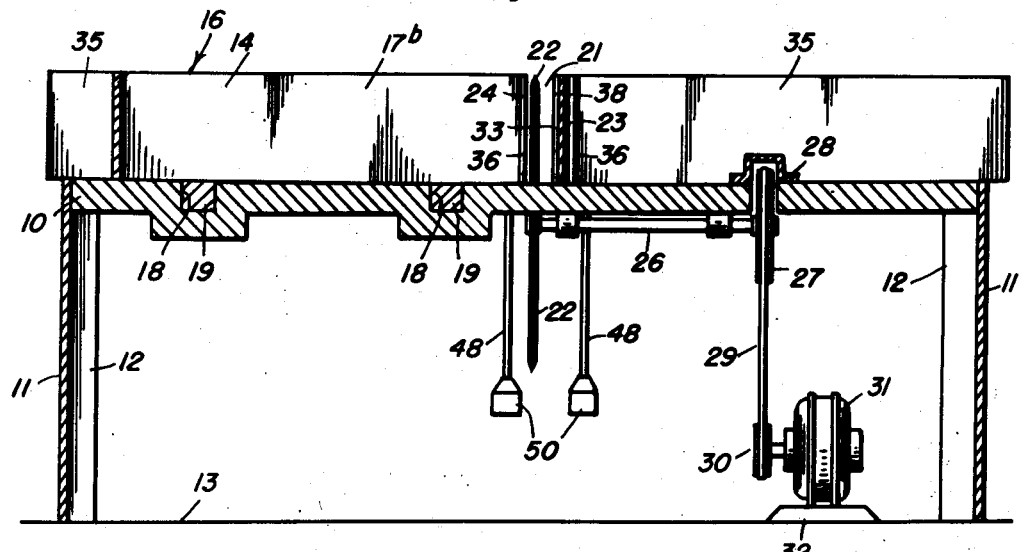
Figure 3 is a similar transverse vertical sectional view taken on the staggered section line 3—3 of Figure 1.
Figure 6:
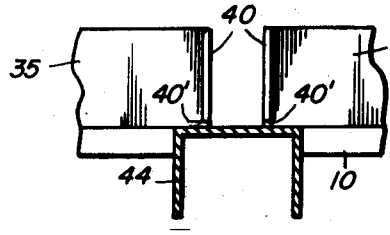
Figure 6 is a sectional view taken on the line 6—6 of Figure 1.
Figure 9:
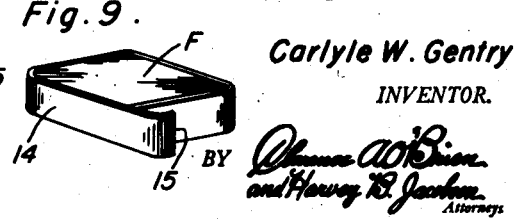
Figure 9 is a perspective view of an ice cream sandwich filler after it has been sliced from the mass.

Extending transversely through the table 10 to the rear of the rear end of the slot 25 are axially spaced axially aligned slots 46 and 46', the adjacent ends of which are spaced from one another to form a supporting web 49, as will be readily understood upon reference to Figure 2. Fixed to the web 49 adjacent the inner end of the slot 46' and in alignment with the cutting blade 22 is an upwardly extending stop 39 and fixed to the table 10 in spaced parallel relation to the stop wall 39 and adjacent the inner end of the slot 46 is an elongated upstanding stop and guide wall 38, the end of which remote from the slot 46 extends toward the front of the table 10 and terminates beyond the shaft 26. The rear ends of the stops 38 and 39 terminate in a common plane to the rear of the slots 46 and 46' and cooperate with the blade 22 in forming a guideway through which the severed sandwich fillers are advanced.

Extending transversely of the table on opposite sides of and in spaced relation to the side walls of the slots 46 and 46' are upwardly extending spaced parallel guide walls 35 and 35' forming in conjunction with end walls 47 adjacent opposite side edges of the table 10 opposed aligned magazines or holders for groups or stacks of wafers or cakes 34. The adjacent ends of the walls 35' are spaced from the stops 38 and 39, on their respective sides of the table 10, a distance substantially equal to the thickness of a wafer or cake and extending from the adjacent ends of the walls 35 nearest the front of the table 10 are spaced parallel guides 36. These guides 36 project in the direction of the front of the table and terminate in outwardly bent guide tongues 37, the purpose of which will more fully hereinafter appear.

As illustrated in Figure 1, the adjacent ends of the rear walls 35' of the magazines terminate in rearwardly extending spaced parallel vertically disposed guides 40, the lower edges of which are spaced from the table 10 as at 40' to accommodate the bottom wall of a rectangular tubular outer wrapper 41 in which the completed sandwiches are received as will be more fully hereinafter explained. The channel formed between the guides 40 aligns axially with and is slightly narrower than the channel formed between the guides 36 so that the wafers will be held tightly against the sliced sandwich fillers during the movement of the sandwiches into the outer wrapper. The ends of the guides 40 remote from the walls 35' project beyond the rear end edge of the table 10 and fixed to the table and projecting rearwardly therefrom in a plane therewith and in axial alignment with the channel formed between the guides 40 is a supporting arm upon which the packaged sandwiches are deposited for subsequent removal from the machine.

In order to form partially wrapped sandwich fillers, I introduce sandwich filling material F into one or more elongated substantially rectangular tubular wrappers 14 formed of a suitable flexible frangible material, such as waxed paper, and after the filling, such as ice cream has been properly hardened into a loaf, as by subjecting it to a low temperature in a hardening room, the loaf of filling material and its wrapper are sliced into separate partially wrapped sandwich fillers by moving them into contact with the rotary cutter or knife 22. In the formation of the tubular wrappers the adjacent edges of a sheet of waxed paper or the like are so joined as to leave a free marginal strip 15 which, when the wrapper and filling are severed to form the partially wrapped sandwich fillers, forms a tab on each filler wrapper by which the latter may be stripped from the filler.

Mounted for sliding movement over the top of the table 10 along a rectilinear path which lies parallel to the rotary cutter 22 is a rectangular frame designated generally 16 having front and rear walls 17a and 17b held in spaced parallel relation by guides 19 which are received in the grooves 18 previously described. As shown in Figure 1, the end wall 17c of the frame 16 lies perpendicular to the walls 17a and 17b and aligns with the space between the guides 36 and 38 and extending rearwardly across the top of the table 10 from the rear end of the wall 17c is a push arm 23 which terminates between the forward ends of the guides 36 and 38 when the frame 16 is retracted to the fullest extent toward the front of the table 10. The end of the wall 17b nearest the wall 17c terminates in spaced relation to the wall 17c and projecting rearwardly of the table 10 from the back wall 17c of the frame is a push arm 23. As illustrated in Figure 1, the push arm 24 aligns with the space between the guide 36 and the rotary cutter 22 and it will thus be seen that as the frame 16 is moved rearwardly along the top of the table, the end of the arm 23 will advance between the guides 36 and 38 to engage a wafer in the right hand magazine M₁ while the arm 24 will move between the cutter 22, guide 36 and stop 39 to engage a wafer in the left hand magazine M₂. Continued rearward movement of the frame will cause the wafers engaging opposite stops to be ejected from their respective stacks into the channel formed between the guides 40 adjacent opposite sides thereof. The end edges of the push arms 23 and 24 are preferably toothed as at 33 and adjacent teeth are bent in opposite directions to form relatively broad pushing heads for engaging with the wafers or cakes 34.

Mounted in the slots 46 and 46' adjacent their adjacent ends for rotation about axes which lie perpendicular to the longitudinal axis of the slots are guide rollers 51 over which run tapes or cables 48 of flexible material. A follower or pressure block 45 is mounted in each magazine M₁ and M₂ formed by the walls 35, 35' and 47 and one end of each tape or cable 48 is fixed to the follower 45 on its respective side of the table 10. A counterweight 50 is fixed to the end of each tape or cable 48 remote from its respective follower or pressure block so that the pressure blocks will be urged under uniform yielding pressure toward the inner ends of the magazines to cause the stacks of wafers or cakes 34 to be held against the stops 38 and 39.

In use, wafers, cakes or the like 34 are introduced into the magazines between the pressure blocks 45 and the stop walls 38 and 39. The tubes 14 having been filled with a suitable filling material F and hardened as previously described are placed in the frame 16 which has been previously retracted to its fullest extent. The frame 16 is then advanced and the units of hardened filling and their respective wrappers moved into contact with the rotary cutter 22 so as to sever successively from the hardened and wrapped units of filling material slices of a thickness equal to the distance between the rotary cutter 22 and the wall 38. Simultaneously with the slicing of the sandwich fillers, the serrated ends 33 of the push arms 23 and 24 will contact the wafers or cakes lying in contact with the stops 38 and 39 so that as the sandwich fillers pass beyond the rear ends of the stop walls 38 and 39 they will be received between successive pairs of wafers or cakes 34. The sandwiches are thus formed as the sandwich fillers and the wafers are moved edgewise into the channel or space between the guides 40 and in order to completely protect edible ingredients, an outer tubular wrapper 41 of flexible frangible material, such as waxed paper, is supported on the guides 40 in expanded position. It will thus be seen that as the formed sandwiches enter the space between the guides 40 they will automatically be encompassed by the wrapper 41. When the space between the guides 40 is completely filled with sandwiches the wrapper 41, with the sandwiches therein in edge to edge relation, is removed from the guides to the supporting surface 44 for subsequent disposition. In the preferred form of the invention, the wrapper 41 is provided with longitudinally spaced rows of perforations or scores 42 extending around the perimeter to facilitate the separation of a single completely wrapped sandwich from a group of sandwiches contained in the same wrapper.

The consumer upon receiving a sandwich fully wrapped simply removes the outer wrapper 41 by slipping it over one end of the sandwich to expose the edible wafers on the opposite sides of the filler. Having thus removed the outer wrapper the filler wrapper 14 is removed by grasping the tab 15 and stripping the strip or ribbon of wrapping 14 from the edges of the edible filler and the sandwich is ready for consumption.

While in the foregoing there has been shown and described the preferred embodiment of this invention it is to be understood that minor changes in the details of construction, combination and arrangement of parts may be resorted to without departing from the spirit and scope of the invention as claimed.

Having described the invention what is claimed as new is:

1. The method of making ice cream sandwiches comprising introducing a filling of hardened ice cream into an open-ended container, slicing said container and filling to form sandwich fillers, feeding said fillers successively in between two stacks of cakes simultaneously with slicing of the container and filling, and feeding the cakes of the stacks successively against opposite sides of the successively fed fillers simultaneously with the slicing of said container and filler and the feeding of said fillers, whereby to complete the sandwiches.

2. The method according to claim 1 and feeding each completed sandwich from in between the stacks by pressure exerted simultaneously against both cakes of the sandwich at opposite sides of the filler.

CARLYLE W. GENTRY.

References Cited in the file of this patent

UNITED STATES PATENTS

| Number | Name | Date |
|---|---|---|
| 1,482,138 | Moomjian | Jan. 29, 1924 |
| 1,497,863 | Lux et al. | June 17, 1924 |
| 1,755,699 | Loehr | Apr. 22, 1930 |
| 1,798,560 | Saetta | Mar. 31, 1931 |
| 2,122,523 | Hulskamp | July 5, 1938 |
| 2,136,505 | Hirschson | Nov. 15, 1938 |
| 2,154,695 | Phelps et al. | Apr. 18, 1939 |
| 2,154,697 | Phelps | Apr. 18, 1939 |
| 2,260,563 | Elliott, Sr. | Oct. 28, 1941 |
| 2,347,162 | Watts | Apr. 18, 1944 |